United States Patent [19]

Coleman

[11] 4,193,106

[45] * Mar. 11, 1980

[54] MONOLITHIC CERAMIC CAPACITOR WITH FUSE LINK

[75] Inventor: James H. Coleman, Wichita Falls, Tex.

[73] Assignee: Sprague Electric Company, North Adams, Mass.

[*] Notice: The portion of the term of this patent subsequent to Aug. 15, 1995, has been disclaimed.

[21] Appl. No.: 871,903

[22] Filed: Jan. 24, 1978

[51] Int. Cl.² ............................................. H01G 1/11
[52] U.S. Cl. ..................................... 361/275; 361/321
[58] Field of Search ................................. 361/275, 321

[56] References Cited

U.S. PATENT DOCUMENTS

| | | | |
|---|---|---|---|
| Re. 26,421 | 7/1968 | Rodriguez | 29/25.42 |
| 3,838,320 | 9/1974 | Klein | 361/321 |
| 3,896,354 | 7/1974 | Coleman | 361/321 |
| 4,107,759 | 8/1978 | Shirn | 361/275 |

Primary Examiner—E. A. Goldberg
Attorney, Agent, or Firm—Connolly and Hutz

[57] ABSTRACT

A monolithic ceramic capacitor has a ceramic body with two sets of mutually parallel interdigitated electrodes buried therein. The electrodes of one set extend to one end face of the body contacting a conductive terminal layer on the one end face. The electrodes of the other set extend to a side face of the body contacting a second terminal layer intermediate the two end faces. The opposite end face has a third terminal layer that does not contact any of the electrodes. A fuse link is connected external to the body between the second and third terminal layer.

3 Claims, 10 Drawing Figures

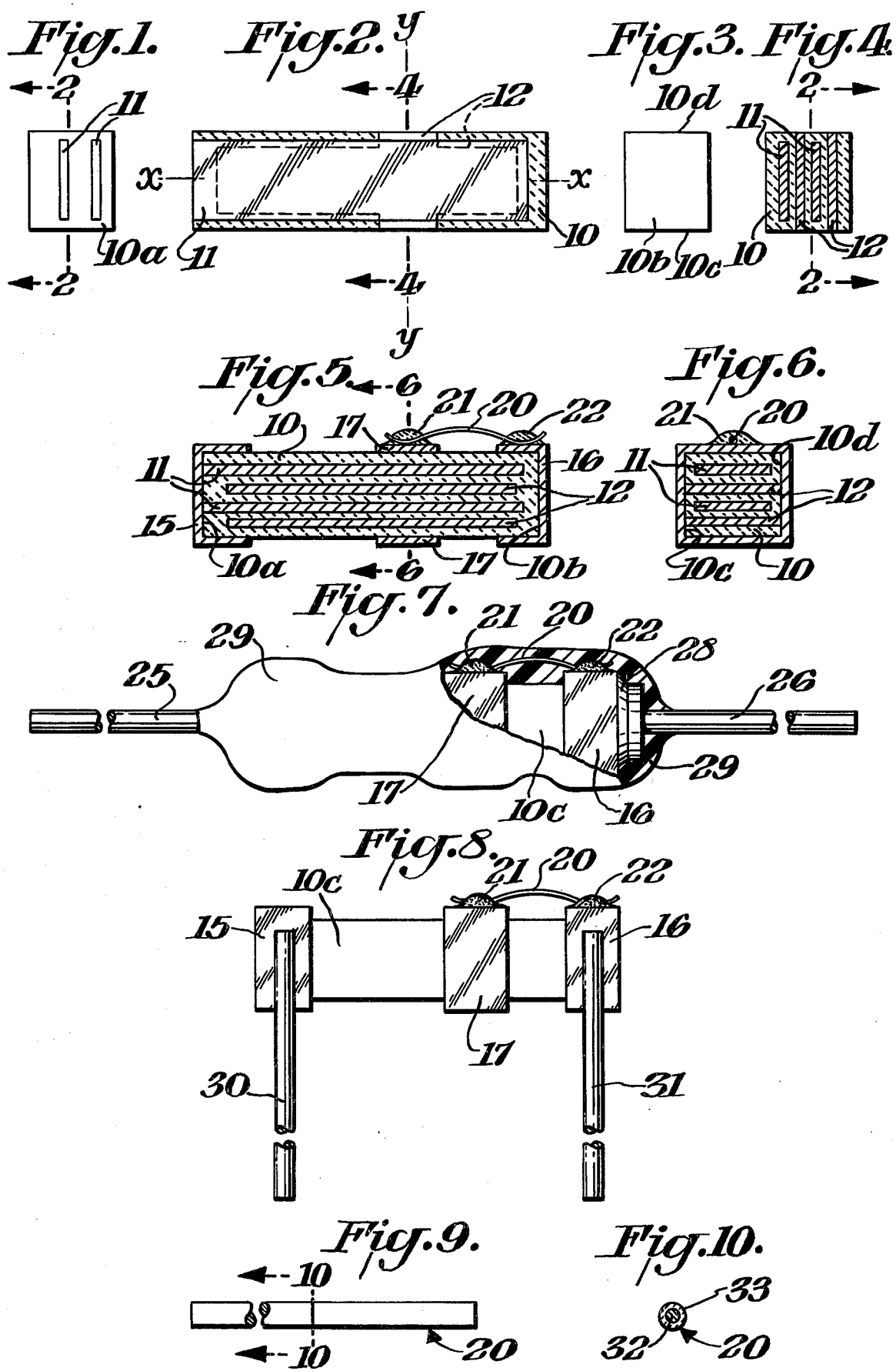

MONOLITHIC CERAMIC CAPACITOR WITH FUSE LINK

BACKGROUND OF THE INVENTION

This invention relates to a monolithic ceramic capacitor with a fuse link in series connection with the capacitor. Such a ceramic capacitor is described in the patent to Shirn et al, U.S. Pat. No. 4,107,759 issued Aug. 15, 1978 that is assigned to the same assignee as is the present invention. Monolithic ceramic capacitors are particularly suitable for use wherein a large volt-microfarad-product is desired in a small volume package. The dimensions of monolithic ceramic capacitors are typically within the range of 0.05 to 0.5 inch (1.27 to 0.013 centimeters). It has been found difficult to attach a series connected fuse link to such small bodies to produce a not greatly enlarged but still reliable capacitor package.

It is therefore an object of this invention to provide a fused monolithic ceramic capacitor having a simpler structure that is relatively easy to produce.

It is a further object of this invention to provide such a capacitor wherein conventional end-terminals are employed for electrically and mechanically attaching the capacitor to an electrical system.

SUMMARY OF THE INVENTION

A monolithic ceramic body has buried therein two alternate sets of interdigitated spaced parallel film electrodes. Mutually perpendicular axes of the body define a plane that is parallel to the electrodes and one alternate set of electrodes extends in one X-axis direction to an end face of the body. This set does not extend to the opposite end face. The other set of electrodes does not extend to either of the two aforementioned end faces, but extends laterally to at least one side face of the body in a Y-axis direction. First and second conductive terminal layers are formed at the two end faces contacting the one set of electrodes at the one end face and no electrodes at the other, respectively. A third conductive terminal layer is formed in a body region between the two end faces and contacts the other set of electrodes at the one side of the body.

A fuse link is connected between the second and third terminal layers so that the fused capacitor may be subsequently attached in an electrical system by contacting the first and second terminal layers at opposite end faces of the capacitor. Thus, attachment of the fused capacitor of this invention may be accomplished by any of the conventional attachment means such as reflow soldering directly to a printed circuit board or attaching leads to the end terminal layers by which the capacitor is mounted in the system. The use of these conventional attachment processes tends to keep the costs of attachment low. The simple structure further eliminates the need for awkward bends in the lead wires or insulated cross-overs between a lead wire and another terminal that may be necessary in fused capacitors of the prior art. The amount of capacitor-package-volume that is occupied by the fused monolithic capacitor of this invention also tends to be less, an important consideration particularly in the smaller capacitor sizes.

The fuse link is preferably one of the type consisting of two exothermically alloyable elements in intimate contact with each other. An encapsulating resin coating may encompass the body and the fuse link.

BRIEF DESCRIPTION OF THE DRAWING

FIG. 1 shows in end view a monolithic ceramic capacitor body of this invention.

FIG. 2 shows in a top sectional view the capacitor body of FIG. 1 taken in plane 2—2.

FIG. 3 shows in the opposite-end view the capacitor body of FIG. 2.

FIG. 4. shows in end sectional view the body of FIG. 2 taken in plane 4—4.

FIG. 5 shows in side sectional view the body of FIG. 2 after three terminal layers have been bonded thereto, and a fusable link connected between two of the layers.

FIG. 6 shows in end sectional view the body of FIG. 6 taken in plane 6—6.

FIG. 7 shows in side view the body having axially extending lead wires attached to two of the terminal layers, respectively, and having an encapsulating protective resin coating which is shown broken away to reveal the fuse link and the structure of the lead attachment means.

FIG. 8 shows in side view a body of the type shown in FIG. 5 having two radially extending lead wires attached to the two end terminal layers, respectively.

FIG. 9 shows magnified in side view a fusable wire link of this invention.

FIG. 10 shows in end sectional view the link of FIG. 9 taken in plane 10—10.

DESCRIPTION OF THE PREFERRED EMBODIMENTS

A dielectric ceramic body 10 has two sets of interdigitated planar film electrodes 11 and 12 buried therein, as illustrated in FIGS. 1 through 6. Mutually perpendicular axes, X and Y, of the body define a plane 2—2 coincident with one of the film electrodes 11, to which plane all electrodes 11 and 12 are parallel.

The electrodes 11 extend in an X-axis direction to the left end face 10a but are recessed or spaced from the right end face 10b. The electrodes 12 are recessed in both X-axis directions from both end faces 10a and 10b. Portions of the electrodes 12 extend in he Y-axis directions to two opposite side faces 10c and 10d. In general, however, they need only extend to one of the side faces.

Referring now in particular to FIGS. 5 and 6, the body 10 is shown having two conformal cup shaped conductive layers 15 and 16 formed over the opposite end faces 10a and 10b. These layers 15 and 16 are conveniently formed by the conventional dipping of the body ends into an ink containing a glass frit, silver particulars and an organic binder. The ink contains 60% by weight of silver particles and a lead-borosilicate glass having a melting temperature of about 600° C. mixed in terpineol with ethyl cellulose as a binder. The ink layers are then fired at 850° C. to burn out the organic binder and to sinter the glass and silver for making highly conductive termination layers 15 and 16 that are tightly bonded to the body 10. Layer 15 contacts electrodes 11 at end face 10a, but layer 16 at the other end 10b does not contact any of the recessed electrodes.

A third termination layer 17 encircles and is bonded to the body in a region intermediate the end layers 15 and 16. This layer 17 contacts the film electrodes 12 at side faces 10c and 10d. Layer 17 is formed by brushing the aforementioned silver ink in a band about the body and firing it simultaneously with layers 15 and 16. Generally, however, layer 17 need not encircle the body and may exist only on one body side face contacting electrodes 12.

A fusable wire 20 is connected between the terminal layers 16 and 17 making an electrical connection therebetween. The particular fusable wire 20 employed here is an exothermically alloyable bi-metallic type that is described in the aforementioned patent U.S. Pat. No. 4,107,759. This patent application also describes methods of attachment of such a fuse to terminals of a monolithic ceramic body and is incorporated by reference herein. The fusable wire 20 is attached to layers 17 and 16 by solder joints 21 and 22, respectively, as illustrated in FIG. 5.

The fused capacitor body of FIGS. 5 and 6 is shown in FIG. 7 having two nail-head lead wires 25 and 26 attached by solder joints 27 (not shown) and 28 to terminal layers 15 and 16, respectively. A protective resin coating 29 encompasses the body 10 and the fuse 20. This coating may be formed by any of the well known methods such as applying a liquified resin and curing or by molding.

An alternative capacitor structure of this invention is illustrated in FIG. 8, wherein the capacitor-fuse assembly of FIG. 5 has two radially extending lead wires 30 and 31 attached to the termination layers 15 and 16, respectively.

The fuse wire 20, illustrated in FIGS. 9 and 10 consists of an aluminum core wire 32 having a palladium cladding 33, the overall diameter being 0.002 inch (0.005 cm). This and other exothermically alloyable fuse links that are suitable for use in capacitors of this invention are described in the aforementioned patent U.S. Pat. No. 4,107,759. Other more common fusable links may also be used such as the melting wire type.

What is claimed is:

1. A Monolithic ceramic capacitor comprising a dielectric ceramic body; two alternate sets of interdigitated spaced parallel film electrodes buried in said body, mutually perpendicular X and Y axes of said capacitor defining a plane being parallel to said electrodes, one alternate set of said electrodes extending in one X axis direction to one end face of said body and being recessed within said body from the opposite end face, the other alternate set of said electrodes being recessed within said body from said two end faces and extending in at least one Y axis direction to at least one side face of said body in a region intermediate said end faces; a first termination layer being bonded to said one end face and contacting said one set of electrodes; a second termination layer being bonded to said side face and contacting said second set of electrodes, a third termination being bonded to said opposite end face without contacting either of said electrode sets; two lead wires, one of said wires being connected to said first terminal layer and the other of said wires being connected to said third terminal layer; and a fuse link being connected between said second and third termination layers.

2. The capacitor of claim 1 additionally comprising an insulative resin coating enclosing said body and said fuse link.

3. The capacitor of claim 1 wherein said fuse link consists of two exothermically alloyable elements in intimate contact with each other.

* * * * *